(12) United States Patent
Phelps et al.

(10) Patent No.: US 10,954,798 B2
(45) Date of Patent: Mar. 23, 2021

(54) GAS TURBINE ENGINE WITH OPTIMIZED FAN BLADE GEOMETRY

(71) Applicant: ROLLS-ROYCE plc, London (GB)

(72) Inventors: Benedict Phelps, Derby (GB); Stephane M M Baralon, Derby (GB); Mark J. Wilson, Nottingham (GB)

(73) Assignee: Rolls Royce plc

( * ) Notice: Subject to any disclaimer, the term of this patent is extended or adjusted under 35 U.S.C. 154(b) by 226 days.

(21) Appl. No.: 16/170,688

(22) Filed: Oct. 25, 2018

(65) Prior Publication Data

US 2019/0162070 A1    May 30, 2019

(30) Foreign Application Priority Data

Nov. 24, 2017 (GB) ...................... 1719538

(51) Int. Cl.
| | |
|---|---|
| F01D 5/16 | (2006.01) |
| F02K 3/06 | (2006.01) |
| F01D 25/06 | (2006.01) |
| F01D 5/14 | (2006.01) |
| F02C 7/36 | (2006.01) |

(52) U.S. Cl.
CPC .............. *F01D 5/16* (2013.01); *F01D 5/141* (2013.01); *F01D 25/06* (2013.01); *F02K 3/06* (2013.01); *F02C 7/36* (2013.01); *F05D 2220/323* (2013.01); *F05D 2240/301* (2013.01); *F05D 2250/32* (2013.01); *F05D 2260/4031* (2013.01); *F05D 2260/96* (2013.01)

(58) Field of Classification Search
CPC ............... F01D 5/141; F05D 2240/301; F05D 2260/4031; F04D 29/384
See application file for complete search history.

(56) References Cited

U.S. PATENT DOCUMENTS

| | | | |
|---|---|---|---|
| 2,934,259 A | 4/1960 | Hausmann | |
| 3,565,548 A | 2/1971 | Fowler et al. | |
| 5,554,000 A | 9/1996 | Katoh et al. | |
| 5,642,985 A * | 7/1997 | Spear ...................... | F01D 5/141 |
| | | | 415/181 |
| 2007/0053779 A1 | 3/2007 | Guemmer | |
| 2008/0095633 A1* | 4/2008 | Wilson .................. | F04D 29/384 |
| | | | 416/223 A |

(Continued)

FOREIGN PATENT DOCUMENTS

| | | |
|---|---|---|
| EP | 1712738 A2 | 10/2006 |
| EP | 2275643 | 1/2011 |

(Continued)

OTHER PUBLICATIONS

Janes Aero-Engines, edited by Bill Gunston, Issue Seven, 2000 (Year: 2000).*

(Continued)

*Primary Examiner* — Scott J Walthour
*Assistant Examiner* — David P. Olynick
(74) *Attorney, Agent, or Firm* — Barnes & Thornburg LLP

(57) ABSTRACT

A gas turbine engine 10 is provided in which a fan having fan blades 139 in which the camber distribution relative to covered passage of the fan 13 allows the gas turbine engine to operate with improved efficiency when compared with conventional engines, whilst retaining an acceptable flutter margin.

16 Claims, 6 Drawing Sheets

(56) References Cited

U.S. PATENT DOCUMENTS

2018/0010613 A1   1/2018   Martin et al.

FOREIGN PATENT DOCUMENTS

GB   2443082   4/2008
WO   2015126774   8/2015

OTHER PUBLICATIONS

Klapproth, J, "General Considerations of Mach Number Effects on Compressor-Blade Design," NASA RM E53L23a, Apr. 7, 1954 (Year: 1954).*
Great Britain Search Report dated May 11, 2018, issued in GB Patent Application No. 1719538.9.
Great Britain Search Report dated May 11, 2018, issued in GB Patent Application No. 1719539.7.
Extended EP Search Report dated Jul. 5, 2019 and issued in connection with EP Patent Application No. 18203910.7.
Extended EP Search Report dated Jun. 26, 2019 and issued in connection with EP Patent Application No. 18203911.5.

* cited by examiner

SECTION A-A

SECTION B-B

GAS TURBINE ENGINE WITH OPTIMIZED FAN BLADE GEOMETRY

CROSS-REFERENCE TO RELATED APPLICATIONS

This specification is based upon and claims the benefit of priority from UK Patent Application Number 1719538.9 filed on 24 Nov. 2017, the entire contents of which are incorporated herein by reference.

BACKGROUND

Technical Field

This disclosure relates to a gas turbine engine. Aspects of the disclosure relate to the camber distribution of the fan blades of a gas turbine engine.

Description of the Related Art

Modern gas turbine aero-engines typically comprise a fan, which compresses the incoming air and directs at least a portion of that air along a bypass duct, with the remainder of the air flowing through the engine core.

It is desirable to optimize the overall efficiency of the engine, so as to minimize fuel burn (or specific fuel consumption). However, in designing the engine to have optimum efficiency, the present inventors have understood that other aspects of engine performance may be compromised. One such aspect may be fan operability, for example fan blade flutter margin and/or fan stall margin.

Flutter may be characterized as a self-excited vibration. When the aerofoils in a blade row (such as the fan blades in a gas turbine engine fan) vibrate, they generate unsteady aerodynamic forces on the blade row itself. Under most conditions, these unsteady aerodynamic forces cause the blade row to do work on the surrounding air, and the vibrations decay in amplitude. However, at certain operational conditions (for example certain rotational speeds and/or thrusts and/or combinations thereof), the surrounding air can do work on the fan itself. If the work done by the air exceeds the work (for example by mechanical damping), then the vibrations will grow. This instability is known as flutter. Flutter is undesirable because it can generate large stresses in an engine.

Accordingly, it is desirable to provide an engine with improved overall performance, for example high overall efficiency combined with low susceptibility to flutter and/or stall.

SUMMARY

According to an aspect, there is provided a gas turbine engine for an aircraft comprising:
- an engine core comprising a turbine, a compressor, and a core shaft connecting the turbine to the compressor;
- a fan located upstream of the engine core, the fan comprising a plurality of fan blades; and
- a gearbox that receives an input from the core shaft and outputs drive to the fan so as to drive the fan at a lower rotational speed than the core shaft, wherein:
- for a given cross-section through the fan blade each fan blade has:
  - a camber line defined by the midpoint between its pressure surface and its suction surface, with a true chord being defined as the distance along the camber line between a leading edge and a trailing edge of the fan blade;
  - a covered passage defined as the portion of the cross-section between the trailing edge and a line passing through a point on the suction surface that is closest to the leading edge of a neighbouring fan blade and the leading edge of that neighbouring fan blade;
  - a covered passage length defined as the distance along the camber line that is in the covered passage; and
  - a covered passage percentage defined as the covered passage length (P) as a percentage of the true chord, and wherein:
- for all cross-sections through each fan blade for which the covered passage percentage is between 40% and 70%, the change in angle of the camber line between the leading edge ($\alpha1$) and the point on the camber line that corresponds to the start of the covered passage ($\alpha2$) satisfies:

$$|\alpha2 - \alpha1| \geq 6 + \frac{(\text{covered passage percentage} - 35)}{9}$$

and/or
for all cross-sections through each fan blade for which the covered passage percentage is greater than 60% (for example greater than 50%), the change in angle of the camber line between the leading edge ($\alpha1$) and the point on the camber line that corresponds to the start of the covered passage ($\alpha2$) satisfies:

$$|\alpha1 - \alpha1| \geq 9.$$

The units for any angle referred to herein is degrees.

It is the absolute change in angle of the camber line that is important, and so the magnitude of the difference ($|\alpha2 - \alpha1|$) is used throughout, such that a reference line in the cross-section against which the angles are measured is not important. Typically, the camber line may become more aligned with the axial direction as it progresses from leading edge to trailing edge. However, it will be appreciated that this need not be the case for all cross-sections. Purely by way of example, for some (but not all) blades, at or towards the hub the camber line may pass through the axial direction, such that the leading edge of the camber line and the trailing edge of the camber line point in different directions away from the axial direction.

The covered passage may be referred to as the suction surface covered passage, because it is the part of the blade defined by a line drawn from the suction surface to the leading edge of an equivalent cross-section through a neighbouring blade (the neighbouring blade being the neighbouring blade that is adjacent the suction surface of the blade in question). The equivalent cross-section may be defined as the cross-section of the neighbouring (or adjacent) blade that is at the same percentage span. The line pointing away from the suction surface to the leading edge of the neighbouring blade may include a component in the circumferential direction of the gas turbine engine to intersect the equivalent cross-section of the adjacent blade. The line may appear to be a straight line when viewed from the radial direction (see line J in FIGS. 3 and 4 by way of example, discussed in greater detail below).

Reference to a cross-section through the blade may mean a section through the blade in a plane defined by: a line that passes through the point on the leading edge that is at a given percentage of the span along the leading edge from the leading edge root and points in the direction of the tangent to the circumferential direction at that point on the leading edge; and a point on the trailing edge that is at that same percentage along the trailing edge from the trailing edge root. The radial span m may be taken to extend from a root at a 0% span position to a tip at a 100% span position. The root may be the radially innermost gas-washed part of the blade. The tip may be the radially outermost gas-washed part of the blade. In other disclosures, this radially innermost gas-washed part of the blade may be referred to as the hub.

Optionally, for all cross-sections through each fan blade for which the covered passage percentage is between 40% and 70%, the change in angle of the camber line between the leading edge ($\alpha1$) and the point on the camber line that corresponds to the start of the covered passage ($\alpha2$) may satisfy:

$$|\alpha2 - \alpha1| \geq 7 + \frac{(\text{covered passage percentage} - 35)}{9}.$$

Optionally, for all cross-sections through each fan blade for which the covered passage percentage is between 35% and 80%, the change in angle of the camber line between the leading edge ($\alpha1$) and the point on the camber line that corresponds to the start of the covered passage ($\alpha2$) may satisfy:

$$|\alpha2 - \alpha1| \geq 6 + \frac{(\text{covered passage percentage} - 35)}{9}.$$

Optionally, for all cross-sections through each fan blade for which the covered passage percentage is between 35% and 80%, the change in angle of the camber line between the leading edge ($\alpha1$) and the point on the camber line that corresponds to the start of the covered passage ($\alpha2$) may satisfy:

$$|\alpha2 - \alpha1| \geq 7 + \frac{(\text{covered passage percentage} - 35)}{9}.$$

At cruise conditions, each leading edge of a cross-section through the blade may experience an inlet relative Mach number M1rel. Such an inlet relative Mach number may be determined by the vector sum of the forward speed of the gas turbine engine at cruise (which may be in a substantially axial direction) and the linear blade speed (which may be in a substantially circumferential direction of the gas turbine engine) at the leading edge radius of the given cross-section resulting from the rotation of the fan at cruise.

For all cross-sections through each fan blade for which a value of M1rel at cruise is less than 0.8 (or, in some arrangements, 0.9), the change in angle of the camber line between the leading edge ($\alpha1$) and the point on the camber line that corresponds to the start of the covered passage ($\alpha2$) may satisfy:

$|\alpha1-\alpha1|\geq9$.

For all cross-sections through each fan blade for which a value of M1rel at cruise is less than 0.75, the change in angle of the camber line between the leading edge ($\alpha1$) and the point on the camber line that corresponds to the start of the covered passage ($\alpha2$) may satisfy:

$|\alpha1-\alpha1|\geq10$.

For all cross-sections through each fan blade for which a value of M1rel at cruise is less than 0.8, the change in angle of the camber line between the leading edge ($\alpha1$) and the point on the camber line that corresponds to the start of the covered passage ($\alpha2$) may satisfy:

$|\alpha2-\alpha1|\geq33-(M1rel*30)$.

Optionally, no cross-section through each fan blade may have a value of M1rel at cruise that is greater than 1.15, for example greater than 1.2, for example greater than 1.25.

According to an aspect, there is provided a gas turbine engine for an aircraft comprising:
  an engine core comprising a turbine, a compressor, and a core shaft connecting the turbine to the compressor;
  a fan located upstream of the engine core, the fan comprising a plurality of fan blades; and
  a gearbox that receives an input from the core shaft and outputs drive to the fan so as to drive the fan at a lower rotational speed than the core shaft, wherein:
  for a given cross-section through a fan blade, each fan blade has a camber line defined by the midpoint between its pressure surface and its suction surface, and a covered passage defined as the portion of the cross-section between the trailing edge and a line passing through a point on the suction surface that is closest to the leading edge of a neighbouring fan blade and the leading edge of that neighbouring fan blade;
  at cruise conditions, each cross-section through the blade experiences an inlet relative Mach number M1rel; and
  for all cross-sections through each fan blade for which a value of M1rel at cruise is less than 0.9, the change in angle of the camber line between the leading edge ($\alpha1$) and the point on the camber line that corresponds to the start of the covered passage ($\alpha2$) satisfies:

$|\alpha1-\alpha1|\geq9$ and/or
for all cross-sections through each fan blade for which a value of M1rel at cruise is less than 0.75, the change in angle of the camber line between the leading edge ($\alpha1$) and the point on the camber line that corresponds to the start of the covered passage ($\alpha2$) satisfies:

$|\alpha1-\alpha1|\geq10$ and/or
for all cross-sections through each fan blade for which a value of M1rel at cruise is less than 0.8, the change in angle of the camber line between the leading edge ($\alpha1$) and the point on the camber line that corresponds to the start of the covered passage ($\alpha2$) satisfies:

$|\alpha2-\alpha1|\geq33-(M1rel*30)$ and/or
no cross-section through each fan blade has a value of M1rel at cruise that is greater than 1.15.

The gas turbine engines and/or fan blades described and/or claimed herein (for example having the camber distributions described and/or claimed herein) may provide improved operability (for example in terms of susceptibility to flutter and/or stall) compared with conventional designs. This may allow the use of more competitive engine cycles, for example requiring less compromise for stall and flutter.

At least some of the fan blade arrangements described and/or claimed herein may be said to have increased camber in the region upstream of the covered passage. This may allow reduced camber in the covered passage region of the blade in order to achieve the same overall flow turning (or overall camber). Towards stall of the blade, this may result in the flow more closely following the blade shape towards the trailing edge and/or a healthier boundary layer towards the trailing edge, which may be better able to resist separation. This, in turn, may provide improved operability, such as improved stall margin and/or less susceptibility to flutter.

In general, the use of a gearbox between the turbine and a fan may be beneficial from an efficiency perspective (for example by facilitating lower specific thrust and/or lower rotational speed and/or higher tip loading), but may present operability challenges. For example, such arrangements for improving the engine efficiency may result in fans that are increasingly susceptible to flutter and/or stall. Purely by way of example, this may be a result of increased working line separation (for example between different flight conditions and/or atmospheric conditions, such as sea level static working line and the cruise working line), flatter fan working lines/characteristics, and/or increased flow diffusion. The arrangements of the present disclosure may be particularly, although not exclusively, beneficial for fans that are driven via a gearbox. Such fans may have lower fan blade speeds, which may result in lower inlet relative Mach numbers. Increased leading edge camber may then be tolerated without triggering a sufficiently strong leading edge shock to cause separation. Typically, high incidence angle at the leading edge may contribute to leading edge separation. Additionally or alternatively, as explained above, the arrangements of the present disclosure may be particularly effective in addressing any operability issues presented by the use of such lower speed fans driven via a gearbox.

The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mn 0.7 to 0.9, for example 0.75 to 0.85, for example 0.76 to 0.84, for example 0.77 to 0.83, for example 0.78 to 0.82, for example 0.79 to 0.81, for example on the order of Mn 0.8. Any single speed within these ranges may be the cruise condition. For some aircraft, the cruise conditions may be outside these ranges, for example below Mn 0.7 or above Mn 0.9. It will be appreciated that the unit Mn is used herein to mean Mach Number.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m, for example in the range of from 10500 m to 11600 m, for example in the range of from 10500 m to 11500 m, for example in the range of from 10600 m to 11400 m (for example around 10668 m, which corresponds to 35000 ft in imperial units), for example in the range of from 10700 m to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan is designed to have optimum efficiency.

As noted above, each fan blade may be defined as having a radial span m extending from a root at a 0% span position to a tip at a 100% span position The ratio of the radius of the fan blade at the root to the radius of the fan blade at the tip may be less than 0.35, for example less than 0.34. for example less than 0.33, for example less than 0.32, for example less than 0.31, for example less than 0.3, for example less than 0.29, for example less than 0.28, for example less than 0.27. These ratios may commonly be referred to as the hub to tip ratio. The radius at the root and the radius at the tip may both be measured at the leading edge (or axially forwardmost) part of the blade.

The radius of the fan may be measured between the engine centreline and the tip of a fan blade at its leading edge. The fan diameter (which may simply be twice the radius of the fan) may be greater than 250 cm, for example greater than 260 cm, 270 cm, 280 cm, 290 cm, 300 cm, 310 cm, 320 cm, 330 cm, 340 cm or 350 cm.

A fan tip loading may be defined as $dH/U_{tip}^2$, where dH is the enthalpy rise (for example the 1-D average enthalpy rise) across the fan and $U_1$ is the velocity of the fan tip, for example at the leading edge of the tip (which may be defined as fan tip radius at leading edge multiplied by rotational speed). The fan tip loading at cruise conditions may be greater than (or on the order of) 0.3, for example greater than (or on the order of) 0.31, for example greater than (or on the order of) 0.32, for example greater than (or on the order of) 0.33, for example greater than (or on the order of) 0.34, for example greater than (or on the order of) 0.35, for example greater than (or on the order of) 0.36, for example in the range of from 0.3 to 0.4 (all units in this paragraph being $JKg^{-1}K^{-1}/(ms^{-1})^2$).

Fan tip loading in the ranges described and/or claimed herein (which may in general be higher than some conventional arrangements) may be beneficial to overall engine performance. The engine arrangements (for example the camber distributions) described and/or claimed herein may enable such fan tip loading whilst maintaining acceptable (or sufficient) operability, for example in terms of flutter and/or stall margin.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than 10, for example greater than 11, for example greater than 11.5, for example greater than 12, for example greater than 13, for example greater than 14, for example greater than 15. The bypass duct may be substantially annular. The bypass duct may be radially outside the core engine.

The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than 110 $NKg^{-1}s$ for example less than 105 $NKg^{-1}s$, for example less than 100 $NKg^{-1}s$, for example less than 95 $NKg^{-1}s$, for example less than 90 $NKg^{-1}s$. Such engines may be particularly efficient in comparison with conventional gas turbine engines.

The gas turbine engines described and/or claimed herein may or may not be provided with a variable area nozzle (VAN). Such a variable area nozzle may allow the exit area of the bypass duct to be varied in use. In general, gas turbine engines with VANs may have higher tip loadings than those without VANs, but the general principles of the present disclosure may apply to engines with or without a VAN.

The gas turbine engine as described and/or claimed herein may have any suitable general architecture. For example, the gas turbine engine may have any desired number of shafts that connect turbines and compressors, for example one, two or three shafts. Purely by way of example, the turbine may be a first turbine, the compressor may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

A gas turbine engine as described and/or claimed herein may have any desired maximum thrust. Purely by way of non-limitative example, a gas turbine as described and/or claimed herein may be capable of producing at least 170 kN of thrust, for example at least 180 kN, for example at least 190 kN, for example at least 200 kN, for example at least 250 kN, for example at least 300 kN, for example at least 350 kN, for example at least 400 kN. The thrust referred to above may be at standard atmospheric conditions.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream (for example at the exit of) the exit to the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes. The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Any fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre, and/or from a metal, such as a titanium based metal or an aluminium based material (such as an Aluminium-Lithium alloy) or a steel based material.

A fan as described and/or claimed herein may comprise a hub, from which the fan blades may extend, for example in a radial direction. The fan blades may be attached to the hub in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a hub. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

Where reference is made to the axial, radial and circumferential directions, the skilled person will readily understand this to mean the conventional directions of a gas turbine engine. For example, viewing the blade along a circumferential direction may mean viewing the blade in side profile and/or in the meridional plane and/or projected onto a plane defined by the axial and radial directions.

The skilled person will appreciate that except where mutually exclusive, a feature described in relation to any one of the above aspects may be applied to any other aspect. Furthermore, except where mutually exclusive, any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
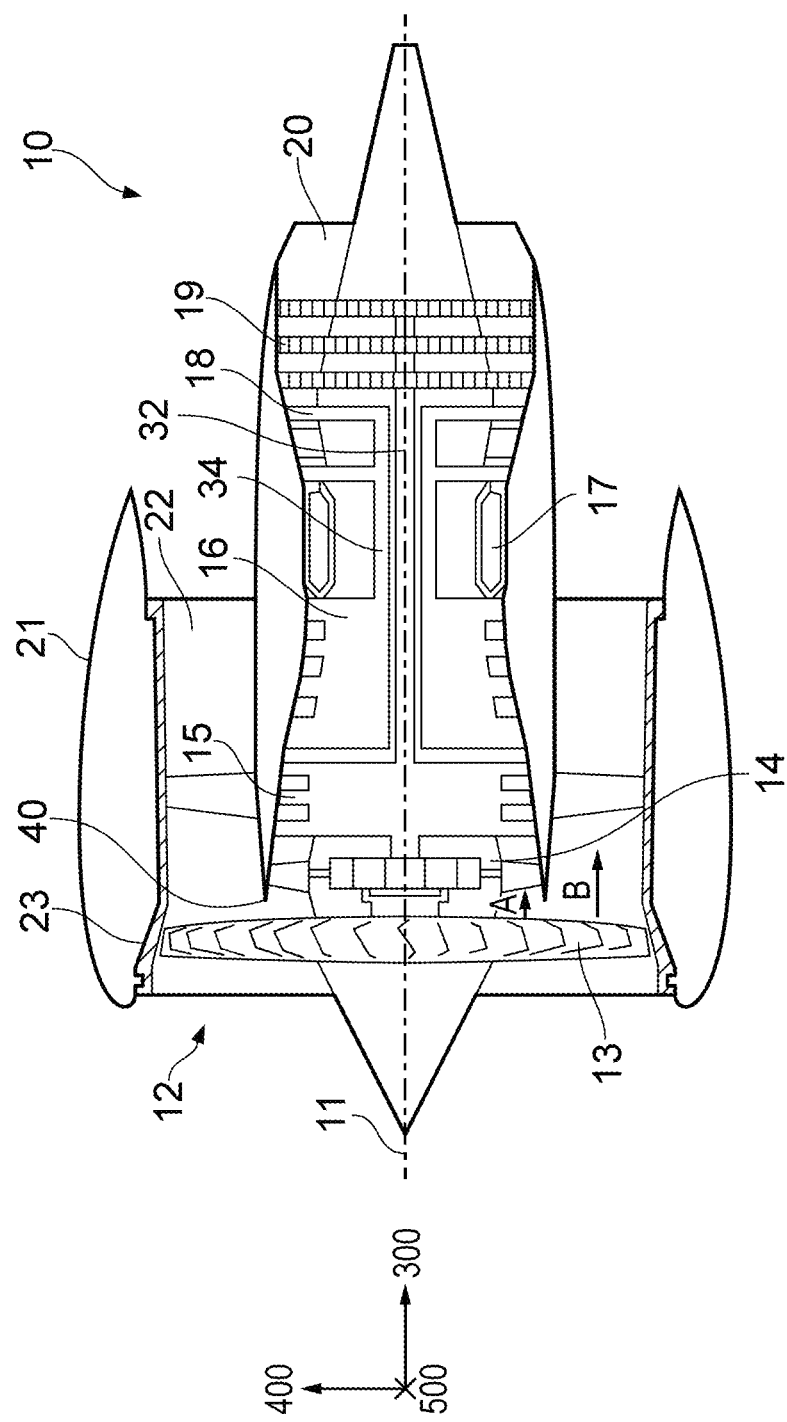
FIG. 1 is a sectional side view of a gas turbine engine in accordance with the present disclosure.

With reference to FIG. 1, a gas turbine engine is generally indicated at 10, having a principal and rotational axis 11. The engine 10 comprises, in axial flow series, an air intake 12, a propulsive fan 13, a gearbox 14, an intermediate pressure compressor 15, a high-pressure compressor 16, combustion equipment 17, a high-pressure turbine 18, a low-pressure turbine 19 and an exhaust nozzle 20. A nacelle 21 generally surrounds the engine 10 and defines the intake 12. The nacelle 21 may be, or may comprise, a fan containment case 23. The nacelle 21 and the fan case 23 may be separate components.

The gas turbine engine 10 works in the conventional manner so that air entering the intake 12 is accelerated and compressed by the fan 13 to produce two air flows: a first air flow A into the engine core and a second air flow B which passes through a bypass duct 22 to provide propulsive thrust. The first and second airflows A, B split at a generally annular splitter 40, for example at the leading edge of the generally annular splitter 40 at a generally circular stagnation line. In use (for example, at cruise conditions, which may be as defined elsewhere herein), the ratio of the mass flow rate of the bypass flow B to the core flow A may be as described and/or claimed herein, for example at least 10.

The engine core includes the intermediate pressure compressor 15 (which may be referred to herein as a first compressor 15) which compresses the air flow directed into it before delivering that air to the high pressure compressor 16 (which may be referred to herein as a second compressor 16) where further compression takes place.

The compressed air exhausted from the high-pressure compressor 16 is directed into the combustion equipment 17 where it is mixed with fuel and the mixture combusted. The resultant hot combustion products then expand through, and thereby drive the high pressure turbine 18 (which may be referred to as a second turbine 18) and the low pressure turbine 19 (which may be referred to as a first turbine 19) before being exhausted through the nozzle 20 to provide additional propulsive thrust. The intermediate pressure compressor 15 is driven by the low pressure turbine 19 by a first (or low pressure) shaft 32. The high pressure compressor 16 is driven by the low pressure turbine 18 by a second (or high pressure) shaft 34. The first shaft 32 also drives the fan 13 via the gearbox 14. The gearbox 14 is a reduction gearbox in that it gears down the rate of rotation of the fan 13 by comparison with the intermediate pressure compressor 15 and low pressure turbine 19. The gearbox 14 may be any suitable type of gearbox, such as an epicyclic planetary gearbox (having a static ring gear, rotating and orbiting planet gears supported by a planet carrier and a rotating sun gear) or a star gearbox. Additionally or alternatively the gearbox may drive additional and/or alternative components (e.g. the intermediate pressure compressor and/or a booster compressor).

The first and second compressors 15, 16, first and second turbines 19, 18, first and second shafts 32, 34, and the combustor 17 may all be said to be part of the engine core.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 24 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction 300 (which is aligned with the rotational axis 11), a radial direction 400, and a circumferential direction 500 (shown perpendicular to the page in the FIG. 1 view). The axial, radial and circumferential directions 300, 400, 500 are mutually perpendicular.

Figure 2:
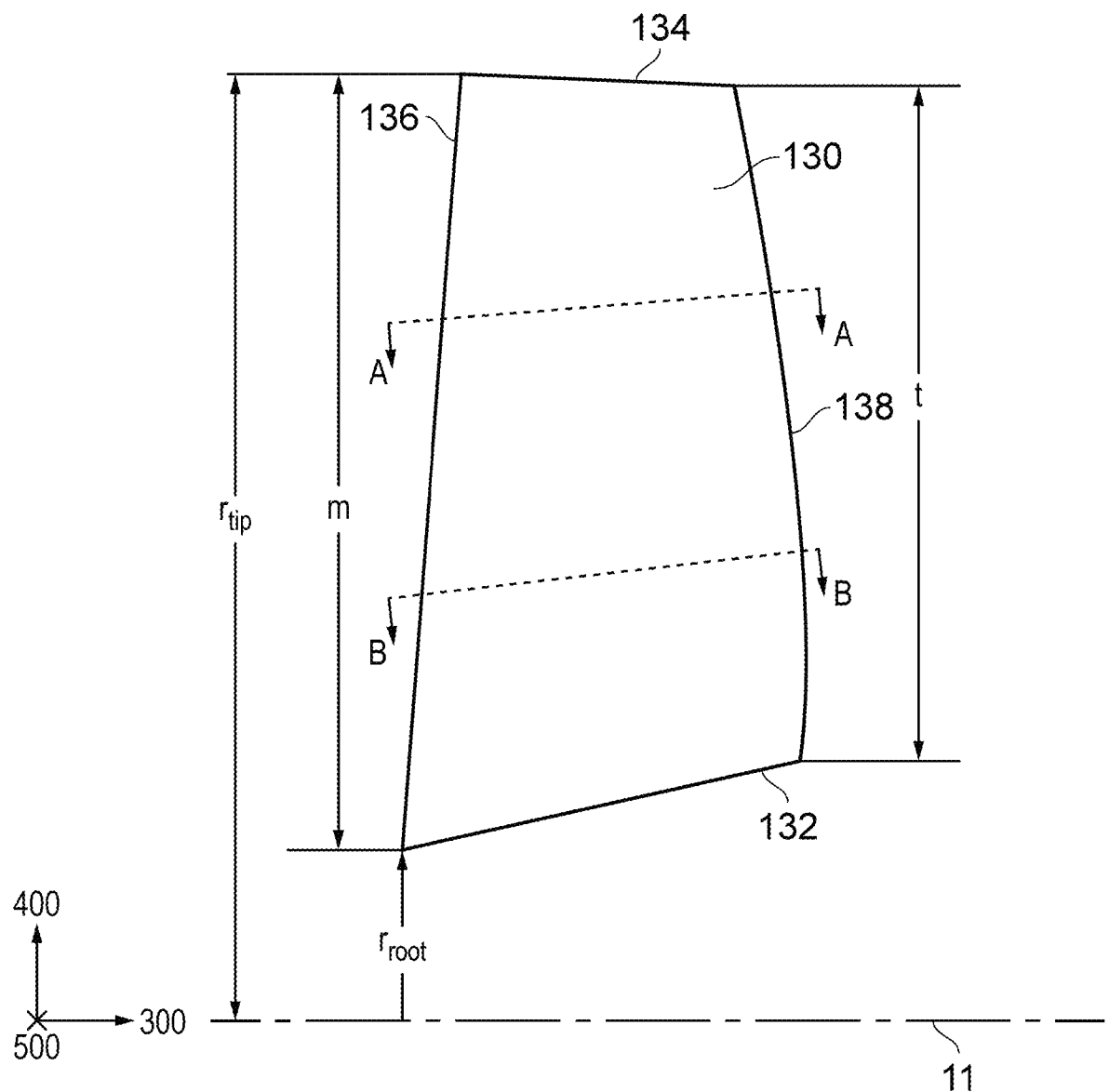
FIG. 2 is a side view of a fan blade for use with examples of the present disclosure.

FIG. 2 shows a fan blade 130 of the fan 13 in the gas turbine engine 10 in greater detail. The fan blade 130 extends from a root 132 to a tip 134 in a substantially radial spanwise direction 400. The root 132 may be defined by the radially innermost gas-washed points of the blade 130 and/or may be defined as an intersection between the fan blade 130 and a surface (for example a conical and/or cylindrical surface and/or an otherwise profiled endwall) from which the fan blades 13 extend. The fan blade 130 has a leading edge 136 and a trailing edge 138. The leading edge 136 may be defined as the line defined by the axially forwardmost points of the fan blade 130 from its root 132 to its tip 134. The fan blade 130 may (or may not) have a fixture portion (not shown) radially inboard of the root, which may be used to fix the fan blade 130 to the rest of the engine.

The radius of the leading edge 136 of the fan blade 130 at its root 132 is designated in FIG. 2 as $r_{root}$. The radius of the leading edge 136 of the fan blade 130 at its tip 134 is designated in FIG. 2 as $r_{tip}$. The ratio of the radius of the leading edge 136 of the fan blade 130 at its root 132 to the radius of the leading edge 136 of the fan blade 130 at its tip 134 ($r_{root}/r_{tip}$) may be as described and/or claimed herein, for example less than 0.35 and/or less than 0.33 and/or less than 0.28.

The span m of the blade 130 is defined as the difference in the radius of the leading edge 136 at the tip and the radius of the leading edge 136 at the root ($r_{tip}-r_{root}$).

In use of the gas turbine engine 10, the fan 13 (with associated fan blades 130) rotates about the rotational axis 11. This rotation results in the tip 134 of the fan blade 130 moving with a velocity $U_{tip}$. The work done by the fan blades 13 on the flow results in an enthalpy rise dH of the flow. Accordingly, a fan tip loading may be defined as $dH/U_{tip}^2$, where dH is the enthalpy rise (for example the 1-D average enthalpy rise) across the fan (or in the bypass stream) and $U_{tip}$ is the velocity of the fan tip (which may be defined as fan tip radius at leading edge multiplied by rotational speed). As noted elsewhere herein, the fan tip loading at cruise conditions may be greater than (or on the order of) 0.3, for example greater than (or on the order of) 0.31, for example greater than (or on the order of) 0.32, for example greater than (or on the order of) 0.33, for example greater than (or on the order of) 0.34, for example greater than (or on the order of) 0.35, for example greater than (or on the order of) 0.36, for example in the range of from 0.3 to 0.4 (all figures having units $JKg^{-1}K^{-1}/(ms^{-1})^2$).

The specific thrust of the gas turbine engine 10 may be in the ranges described and/or claimed herein.

A cross-sectional plane A-A or B-B through the blade 130 may be defined by an extrusion in the circumferential direction of a straight line formed between a point on the leading edge 136 that is at a given percentage X of the span m from the root 132 (i.e. at a radius of ($r_{root}+X/100*(r_{tip}-r_{root})$)), and a point on the trailing edge that is at the same radial percentage X of a trailing edge radial extent t along the trailing edge 138 from the root 132 at the trailing edge 138. The circumferential direction of the extrusion may be taken at the leading edge position of the plane A-A, B-B. In other words, reference to a cross-section through the fan blade 130 may mean a section through the aerofoil in a plane defined by: a line that passes through the point on the leading edge that is at a given percentage of the span m along the leading edge from the leading edge root and points in the direction of the tangent to the circumferential direction at that point on the leading edge; and a point on the trailing edge that is at that same percentage along the trailing edge 138 from the trailing edge root.

Figure 3:
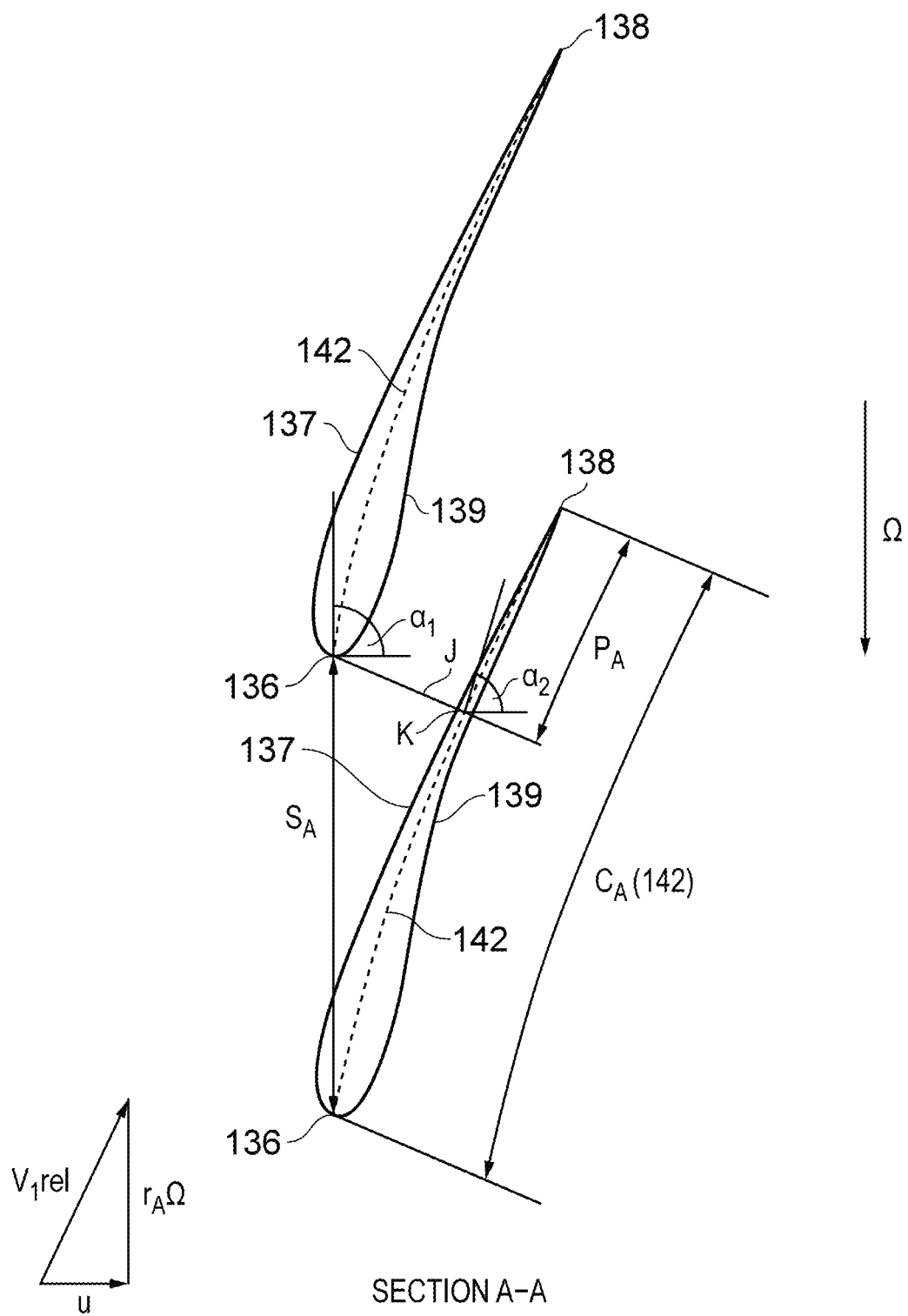
FIG. 3 is a schematic view of two neighbouring blades taken through the cross-section A-A in FIG. 2.
Figure 4:
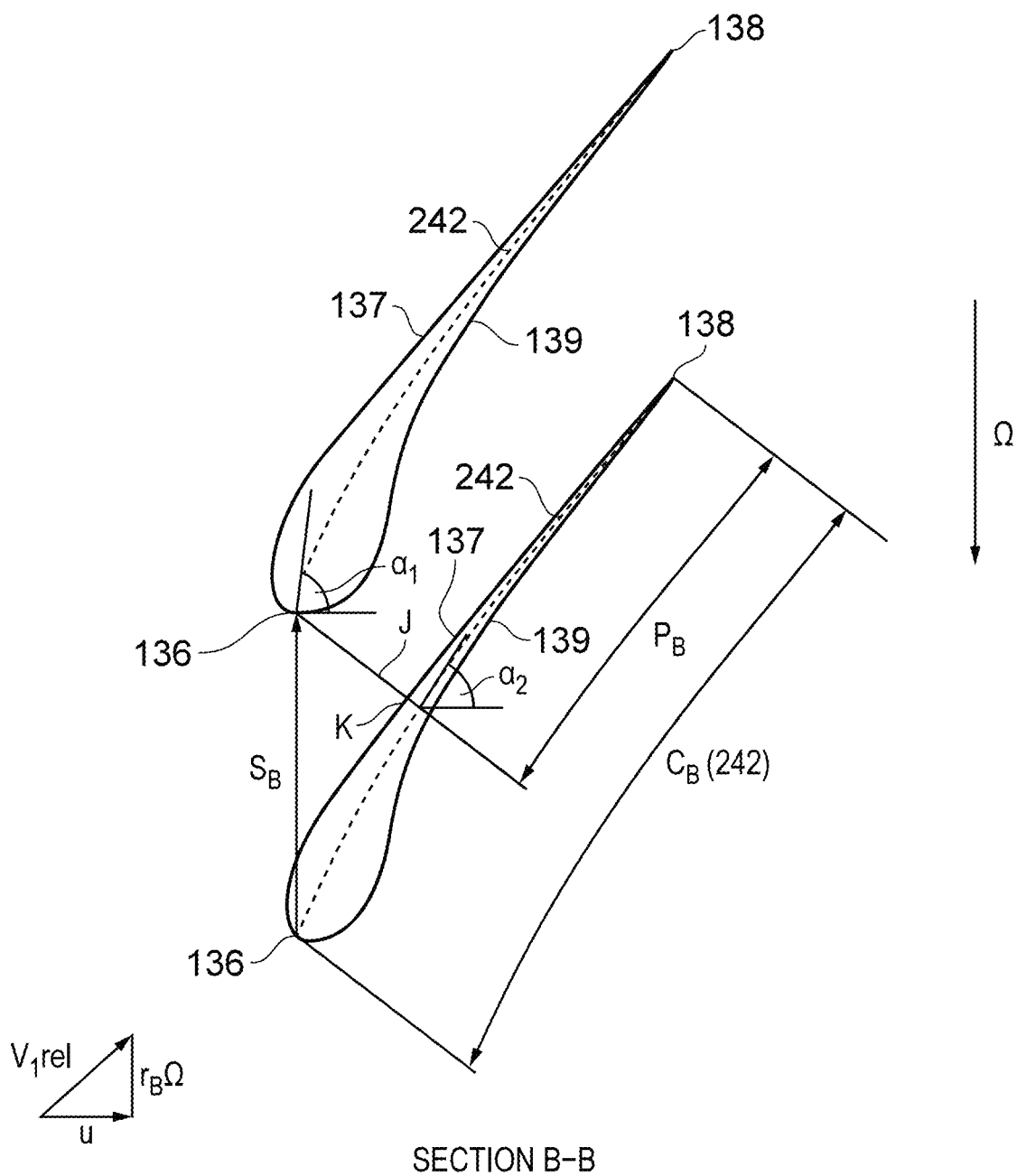
FIG. 4 is a schematic view of two neighbouring blades taken through the cross-section A-A in FIG. 2.

FIG. 3 is a schematic showing a cross-section A-A (indicated in FIG. 2) through two neighbouring fan blades 130. FIG. 4 is a similar schematic to that shown in FIG. 3, but taken through a cross-section B-B at a different spanwise position of the blades 130.

The neighbouring fan blades 130 are both part of the fan 13. The neighbouring fan blades 130 may be substantially identical to each other, as in the example of FIGS. 3 and 4. The spacing between the blades 130 (for example between any two equivalent points on the fan blades 130, for example a given spanwise position on their leading edges 135 and/or trailing edges 138) is indicated by the letter S in FIGS. 3 and 4. This spacing S may be referred to as the pitch of the fan blades 130. Although indicated as a straight line in FIGS. 3 and 4, in the illustrated example the spacing S is actually the circumferential distance between the two neighbouring fan blades 130, and as such may be different depending on the spanwise position of the cross-section (in particular, the spacing S typically increases with increasing spanwise position (or increasing radius)).

A camber line (142 in FIG. 3, 242 in FIG. 4) is defined for a given cross-section as the line formed by the points in that cross-section that are equidistant from a pressure surface 139 and a suction surface 137 of the blade 130 for that cross-section. The change in the angle of the camber line 142, 242 between any two points is simply the angle between the tangent to the camber line 142, 242 at each of those two points.

A true chord for a given cross-section ($C_A$ in FIG. 3, $C_B$ in FIG. 4) is the distance along the camber line (which would typically be a curved line) between the leading edge 136 and the trailing edge 138 of the aerofoil 130 in that cross-section. Accordingly, the true chord ($C_A$, $C_B$) would typically be the length of a curved line. Note that this is different to what might conventionally be referred to as the chord length, which would be the length of a straight line drawn between the leading edge 136 and the trailing edge 138 of the aerofoil 130 in that cross-section (and is not shown in FIGS. 3 and 4).

A covered passage is defined as the part of the blade (or part of the passage between the blades) for a given cross-section that is between a line J that passes through the point K on the suction surface 137 of the blade 130 and the leading edge 136 of the neighbouring blade 130 that is adjacent the suction surface 137. The point K is defined as the point K on the suction surface that is closest to the leading edge 136 of a neighbouring blade. The line J may pass entirely through the cross-section of the blade, so as to separate the cross-section into two parts: a covered passage part that is between the trailing edge 138 and the line J, and a non-covered passage part that is between the leading edge 136 and the line J. The line J may be described as being a straight line when viewed from a radial direction.

A covered passage length P ($P_A$ in FIG. 3 and $P_B$ in FIG. 4) is then defined as the distance along the portion of the camber line C that is within the covered passage portion of the blade. Again, the covered passage length P would therefore typically be the length of a curved line.

A covered passage percentage is then defined as the covered passage length (P) as a percentage of the true chord (C), that is $((P_A/C_A)*100)$ for the cross-section A-A and $((P_B/C_B)*100)$ for the cross-section B-B.

Note that one or both of the true chord length C and local pitch S may change depending on the spanwise position of the cross-section.

The angle of the camber line 142, 242 (that is, the tangent to the angle of the camber line 142, 242) for a given cross-section A-A, B-B changes between the leading edge 136 of the blade 130 and the point on the camber line 142, 242 that is at the start of the covered passage P. In this regard, the start of the covered passage P may be the axially forwardmost point of the covered passage P through which the camber line 142, 242 passes, that is the point at which the line J crosses the camber line 142, 242. The angle of the camber line may be measured relative to any other line in the plane of the cross-section, because it is change in angle of the camber line 142, 242 that is importance.

In the example of FIGS. 3 and 4, the angle of the camber line 142, 242 is measured relative to a line that is parallel with the axial direction 300. The difference between the angle $\alpha_1$ of the camber line 142, 242 at the leading edge 136 and the angle $\alpha_2$ at the start of the covered passage P is simply given by $|\alpha_2-\alpha_1|$. Where the term change (or difference) in angle of the camber line between two points is used herein, this means the magnitude of the change (or difference) in the angle of the camber line between those two points.

It will be appreciated that the length of the covered passage P and the change in angle ($|\alpha_2-\alpha_1|$) of the camber line 142, 242 between the leading edge 136 and the start of the covered passage P are different for at least some cross-sections taken through the blade 130. This is illustrated by way of example only by the difference between the cross-sections A-A and B-B shown in FIGS. 2 to 4.

Figure 5:
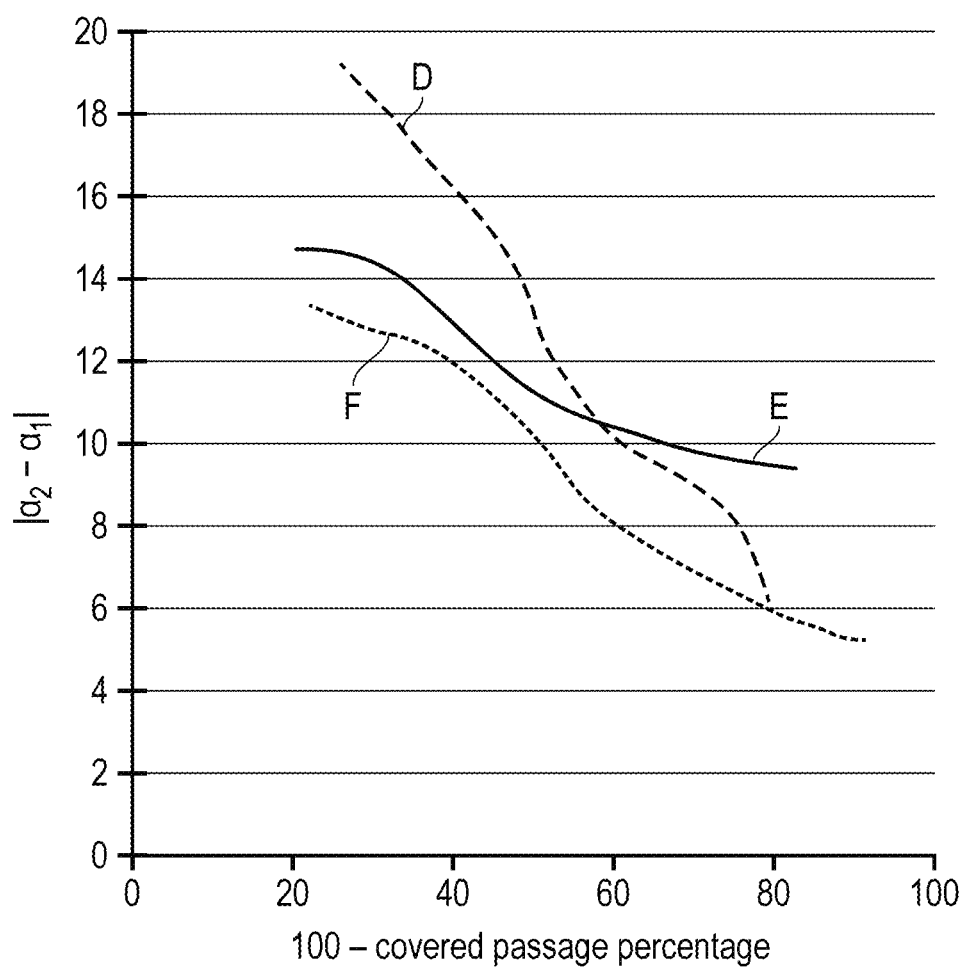
FIG. 5 is a graph showing, by way of example only, covered passage against camber change before the start of the covered passage.

FIG. 5 is a graph showing three examples (lines D, E, F) of how the change in angle ($|\alpha_2-\alpha_1|$) of the camber line 142, 242 between the leading edge 136 and the start of the covered passage P may vary with the covered passage percentage for examples of fan blades 130 in accordance with the present disclosure. Note that the x-axis in FIG. 5 represents (100-covered passage percentage), rather than simply the covered passage percentage. Each of the lines D, E, F represents a different fan blade 130 that may be in accordance with aspects of the present disclosure. Each point on one of the lines D, E, F shown in FIG. 5 represents the change in angle ($|\alpha_2-\alpha_1|$) and the covered passage percentage for a particular cross-section through the respective blade 130. However, each line does not necessarily show all spanwise cross-sections for the fan blade 130. Purely by way of example, the lines D, E, F shown in FIG. 5 may represent spanwise cross-sections extending from 35% to 100% of the blade span, although of course this is in no way limitative, and the curves may represent cross-sections taken over other spanwise extents.

The relationships D, E, F plotted in FIG. 5 are examples of fan blades 130 that satisfy the relationships between the covered passage percentage and the change in angle of the camber line between the leading edge ($\alpha 1$) and the point on the camber line that corresponds to the start of the covered passage ($\alpha 2$) described and/or claimed herein. For example, in the FIG. 5 examples, for all cross-sections through each fan blade 130 for which the covered passage percentage is between 40% and 70%, the change in angle of the camber line between the leading edge (α1) and the point on the camber line that corresponds to the start of the covered passage (α2) satisfies:

$$|\alpha2 - \alpha1| \geq 6 + \frac{(\text{covered passage percentage} - 35)}{9}$$

and/or
for all cross-sections through each fan blade 130 for which the covered passage percentage is greater than 60%, the change in angle of the camber line between the leading edge (α1) and the point on the camber line that corresponds to the start of the covered passage (α2) satisfies:

$|\alpha2-\alpha1|\geq 9.$

In FIG. 5, a point that is more towards the bottom right of the line than another point represents a cross-section that is closer to the tip 134 than that other point. A point on a line that has a higher covered passage percentage relative to another point (i.e. more towards the left of the curves) is generally closer to the tip 134, although this is not essential.

Figure 6:
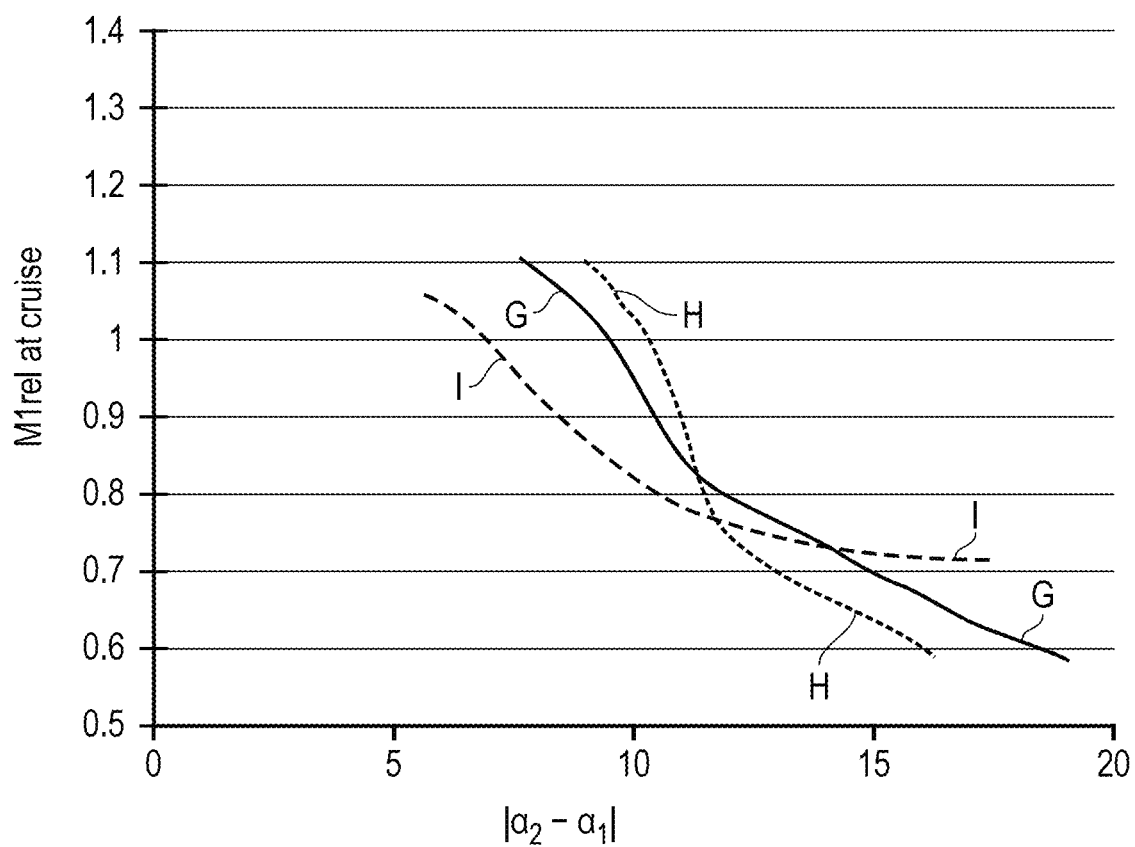
FIG. 6 is a graph showing, by way of example only, camber change before the start of the covered passage against relative Mach number at the leading edge.

FIG. 6 is a graph showing three examples (lines G, H, I) of how the change in angle ($|\alpha_2-\alpha_1|$) of the camber line 142, 242 between the leading edge 136 and the start of the covered passage P may vary with the inlet relative Mach number M1rel for different cross-sections through the blade 130. Each of the lines G, H, I represents a different fan blade 130 that may be in accordance with aspects of the present disclosure, which may be the same or different to the blades 130 represented by lines D, E, F in FIG. 5. Purely by way of example, the line G in FIG. 6 may represent the same blade 130 as the line D in FIG. 6. Each point on one of the lines G, H, I shown in FIG. 6 represents the change in angle ($|\alpha_2-\alpha_1|$) and the inlet relative Mach number for a particular cross-section through the blade 130. However, each line does not necessarily show all spanwise cross-sections for the fan blade 130. Purely by way of example, the lines G, H, I shown in FIG. 6 may represent spanwise cross-sections extending from 35% to 100% of the blade span, although of course this is in no way limitative, and the curves may represent cross-sections taken over other spanwise extents.

The inlet relative Mach number may be calculated using the vector sum of the blade forward speed (which may be taken as the forward speed of an aircraft to which a gas turbine engine 10 is attached) and the linear blade speed at the radial position of the leading edge 136 of the cross-section due to the rotation of the fan blades 130, at cruise conditions (which may be as defined elsewhere herein). This is illustrated schematically in FIGS. 3 and 4, which show a velocity triangle (towards the bottom left of the Figures) in which the forward (axial) velocity of the blade 130 (or engine 10) is shown as "U", the linear circumferential velocity at the respective radius $r_A, r_B$ due to the rotation Ω of the fan 13 is indicated as rΩ, with the vector sum being shown as V1rel. From V1rel, the inlet relative Mach number can be calculated in the conventional manner, using the local speed of sound. The inlet relative Mach number generally increases with increasing radial (or spanwise) position of the cross-section.

The relationships plotted in FIG. 6 are examples of fan blades 130 that satisfy the relationships between the inlet relative Mach number and the change in angle of the camber line between the leading edge (α1) and the point on the camber line that corresponds to the start of the covered passage (α2) described and/or claimed herein. For example, in the FIG. 6 examples, for all cross-sections through each fan blade 130 for which a value of M1rel at cruise is less than 0.8, the change in angle of the camber line between the leading edge (α1) and the point on the camber line that corresponds to the start of the covered passage (α2) satisfies:

$|\alpha1-\alpha1|\geq 9$ and/or
for all cross-sections through each fan blade for which a value of M1rel at cruise is less than 0.75, the change in angle of the camber line between the leading edge (α1) and the point on the camber line that corresponds to the start of the covered passage (α2) satisfies:

$|\alpha1-\alpha1|\geq 10$ and/or
for all cross-sections through each fan blade for which a value of M1rel at cruise is less than 0.8, the change in angle of the camber line between the leading edge (α1) and the point on the camber line that corresponds to the start of the covered passage (α2) satisfies:

$|\alpha2-\alpha1|\geq 33-(M1rel*30).$

In use, the gas turbine engine 10 may operate at the cruise conditions defined elsewhere herein. Such cruise conditions may be determined by the cruise conditions (for example the mid-cruise conditions) of an aircraft to which at least one (for example 2 or 4) gas turbine engine 10 may be mounted in order to provide propulsive thrust. Parameters such as pressure ratios referred to herein may be taken at such a cruise condition.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising: an engine, core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
each fan blade comprises cross-sections, including a first cross-section, the cross-sections comprising: a camber line defined by the midpoint between its pressure surface and its suction surface, with a true chord (C) being defined as the distance along the camber line between a leading edge and a trailing edge of the fan blade;
a covered passage defined as the portion of the cross-section between the trailing edge and a line (J) passing through a point (K) on the suction surface that is closest to the leading edge of a neighbouring fan blade and the leading edge of that neighbouring fan blade;
a covered passage length (P) defined as the distance along the camber line that is in the covered passage; and
a covered passage percentage defined as the covered passage length (P) as a percentage of the true chord (C), the first cross-section of each fan blade having the covered passage percentage between 40% and 70%, wherein the first cross-section defines a change in angle in degrees between a line tangent to the camber line at the leading edge and a reference line (α1) and a line tangent to a point on the camber line that corresponds to the start of the covered passage and the reference line (α2) that satisfies:

$$|\alpha 2 - \alpha 1| \geq 6 + \frac{(\text{covered passage percentage} - 35)}{9}.$$

2. The gas turbine according to claim 1, wherein for the cross-sections through each fan blade for which the covered passage percentage is between 40% and 70%, the change in angle in degrees of the camber line between the leading edge (α1) and the point on the camber line that corresponds to the start of the covered passage (α2) satisfies:

$$|\alpha 2 - \alpha 1| \geq 7 + \frac{(\text{covered passage percentage} - 35)}{9}.$$

3. The gas turbine engine according to claim 1, wherein for the cross-sections through each fan blade for which the covered passage percentage is between 35% and 80%, the change in angle in degrees of the camber line between the leading edge (α1) and the point on the camber line that corresponds to the start of the covered passage (α2) satisfies:

$$|\alpha 2 - \alpha 1| \geq 6 + \frac{(\text{covered passage percentage} - 35)}{9}.$$

4. The gas turbine engine according to claim 1, wherein for the cross-sections through each fan blade for which the covered passage percentage is between 35% and 80%, the change in angle in degrees of the camber line between the leading edge (α1) and the point on the camber line that corresponds to the start of the covered passage (α2) satisfies:

$$|\alpha 2 - \alpha 1| \geq 7 + \frac{(\text{covered passage percentage} - 35)}{9}.$$

5. The gas turbine engine according to claim 1, wherein for the cross-sections through each fan blade for which the covered passage percentage is between 60% and 62%, the change in angle in degrees of the camber line between the leading edge (α1) and the point on the camber line that corresponds to the start of the covered passage (α2) satisfies:

$$|\alpha 2 - \alpha 1| \geq 9$$

6. The gas turbine engine according to claim 1, wherein:
each fan blade has a radial span extending from a root at a 0% span position to a tip at a 100% span position; and
a ratio of a radius of the fan blade at a root ($r_{root}$) to the radius of the fan blade at a tip ($r_{tip}$) is less than 0.33.

7. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

8. The gas turbine engine according to claim 1, wherein the fan diameter is greater than 250 cm.

9. The gas turbine engine according to claim 1, wherein: at cruise conditions, each cross-section through the bade experiences an inlet relative Mach number M1rel; and for the cross-sections through each fan blade for which a value of M1rel at cruise is less than 0.8 and the covered passage percentage is between 40% and 62%, the change in angle in degrees of the camber line between the leading edge (α1) and the point on the camber line that corresponds to the start of the covered passage (α2) satisfies: $|\alpha 2 - \alpha 1| \geq 9$,
wherein the cruise conditions correspond to: a forward Mach number of 0.8; a pressure of 23000 Pa; and a temperature of −55 deg C.

10. The gas turbine engine according to claim 1, wherein: at cruise conditions, each cross-section through the blade experiences an inlet relative Mach number M1rel; and for the cross-sections through each fan blade for which a value of M1rel at cruise is less than 0.75, the change in angle in degrees of the camber line between the leading edge (α1) and the point on the camber line that corresponds to the start of the covered passage (α2) satisfies: $|\alpha 2 - \alpha 1| \geq 10$.

11. The gas turbine engine according to claim 1, wherein: at cruise conditions, each cross-section through the blade experiences an inlet relative Mach number M1rel; and for the cross-sections through each fan blade for which a value of M1rel at cruise is less than 0.8 and the covered passage percentage is between 40% and 62%, the change in angle in degrees of the camber line between the leading edge (α1) and the point on the camber line that corresponds to the start of the covered passage (α2) satisfies:

$|\alpha 2 - \alpha 1| \geq 33 - (M1rel*30)$.

12. The gas turbine engine according to claim 1, wherein: at cruise conditions, each cross-section through the bade experiences an inlet relative Mach number M1rel; and no cross-section through each fan bade has a value of M1rel at cruise that is greater than 1.15, wherein the forward speed of the gas turbine engine at the cruise conditions is in the range of from Mach 0.75 to Mach 0.85.

13. The gas turbine engine according to claim 1, wherein a fan tip loading is defined as $dH/U_{tip}^2$, where dH is an enthalpy rise across the fan and $U_{tip}$ is a velocity of a fan tip, and the fan tip loading at a forward Mach number of 0.8 is greater than 0.3 $JKg^{-1}K^{-1}/(ms^{-1})^2$.

14. The gas turbine engine according to claim 13, wherein the fan tip loading at a forward Mach number of 0.8 is in the range of from 0.3 to 0.4 $JKg^{-1}K^{-1}/(ms^{-1})^2$.

15. The gas turbine engine according to claim 1, wherein the specific thrust at a forward Mach number of 0.8 is less than 100 $NKg^{-1}s$.

16. The gas turbine engine according to claim 1, wherein the change in angle in degrees of the camber line between the leading edge (α1) and the point on the camber line that corresponds to the start of the covered passage (α2) satisfies:

$20 \geq |\alpha 2 - \alpha 1|$

* * * * *